United States Patent [19]
Alisauski

[11] Patent Number: 5,204,609
[45] Date of Patent: Apr. 20, 1993

[54] BATTERY COOLING APPARATUS

[76] Inventor: Daryl J. Alisauski, 168 N. Arlington Ave., Gloversville, N.Y. 12078

[21] Appl. No.: 808,232

[22] Filed: Dec. 16, 1991

[51] Int. Cl.$^5$ .......................................... H01M 10/50
[52] U.S. Cl. ...................................... 320/2; 361/184; 429/120
[58] Field of Search .................... 320/2; 361/381, 384; 429/26, 96, 99, 120; 165/53, 180

[56] References Cited

U.S. PATENT DOCUMENTS

| | | | |
|---|---|---|---|
| 4,383,286 | 5/1983 | Hicks | 361/384 |
| 4,443,524 | 4/1984 | Meinhold et al. | 429/120 X |
| 4,517,263 | 5/1985 | Reiss et al. | 429/120 |
| 4,790,373 | 12/1988 | Raynor et al. | 361/384 X |
| 4,797,783 | 1/1989 | Kohmoto et al. | 361/384 |
| 4,860,163 | 8/1989 | Sarath | 361/384 |
| 4,884,187 | 11/1989 | Budin et al. | 361/384 X |
| 4,935,845 | 6/1990 | Schwenr et al. | 361/384 |
| 4,949,218 | 8/1990 | Blanchard et al. | 361/384 |
| 5,015,545 | 5/1991 | Brooks | 429/99 |

FOREIGN PATENT DOCUMENTS

| | | |
|---|---|---|
| 3224161 | 12/1983 | Fed. Rep. of Germany. |
| 3247969 | 6/1984 | Fed. Rep. of Germany ...... 429/120 |

Primary Examiner—Steven L. Stephan
Assistant Examiner—Kristine Peckman
Attorney, Agent, or Firm—Leon Gilden

[57] ABSTRACT

An enclosure is arranged to receive batteries utilized subsequent to or prior to a radio controlled auto racing event, wherein the batteries are cooled to provide for accurate indication of charging and discharging of the battery. The apparatus includes a fan to direct cooling air through the enclosure and in an embodiment to provide for a cooling medium selectively projected within the enclosure to enhance and accelerate cooling of the batteries. A modification of the invention includes charging and discharging circuitry to permit selective charging and discharging of the batteries when mounted within the enclosure.

3 Claims, 5 Drawing Sheets

BATTERY COOLING APPARATUS

BACKGROUND OF THE INVENTION

1. Field of the Invention

The field of invention relates to battery charging apparatus, and more particularly pertains to a new and improved battery cooling apparatus wherein the same is arranged to provide for the cooling of batteries to provide for accurate charging of the batteries.

2. Description of the Prior Art

Battery apparatus of various types are utilized throughout the prior art. In particular, in a radio controlled car racing event, the batteries are subject to heat in their use. Such heat interferes with accurate reading of the total charging of the batteries preventing a full charge from being imparted to such batteries. While various apparatus are utilized in the prior art for the ventilation of electronics such as exemplified in the U.S. Pat. Nos. 4,797,783; 4,935,845; and U.S. Pat. No. 4,744,005 the prior art has not in this organization been addressed to the particular cooling of the battery structure. U.S. Pat. No. 4,949,218 to Blanchard, et al sets forth a cabinet with a built-in cooling system utilizing a battery charger in association with a battery supply that is effectively a portion of an overall electronic cooling organization.

As such, it may be appreciated that there continues to be a need for a new and improved battery cooling apparatus as set forth by the instant invention which addresses both the problems of ease of use as well as effectiveness in construction in permitting the selective mounting of batteries relative to the associated enclosure structure to permit the selective cooling of the batteries and in this respect, the present invention substantially fulfills this need.

SUMMARY OF THE INVENTION

In view of the foregoing disadvantages inherent in the known types of battery apparatus now present in the prior art, the present invention provides a battery cooling apparatus wherein the same provides for the cooling of batteries permitting their effective charging and discharging subsequent to use. As such, the general purpose of the present invention, which will be described subsequently in greater detail, is to provide a new and improved battery cooling apparatus which has all the advantages of the prior art battery apparatus and none of the disadvantages.

To attain this, the present invention provides an enclosure arranged to receive batteries utilized subsequent to or prior to a radio controlled auto racing event, wherein the batteries are cooled to provide for accurate indication of charging and discharging of the battery. The apparatus includes a fan to direct cooling air through the enclosure and in an embodiment to provide for a cooling medium selectively projected within the enclosure to enhance and accelerate cooling of the batteries. A modification of the invention includes charging and discharging circuitry to permit selective charging and discharging of the batteries when mounted within the enclosure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved battery cooling apparatus which has all the advantages of the prior art battery apparatus and none of the disadvantages.

It is another object of the present invention to provide a new and improved battery cooling apparatus which may be easily and efficiently manufactured and marketed.

It is a further object of the present invention to provide a new and improved battery cooling apparatus which is of a durable and reliable construction.

Still yet another object of the present invention is to provide a new and improved battery cooling apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
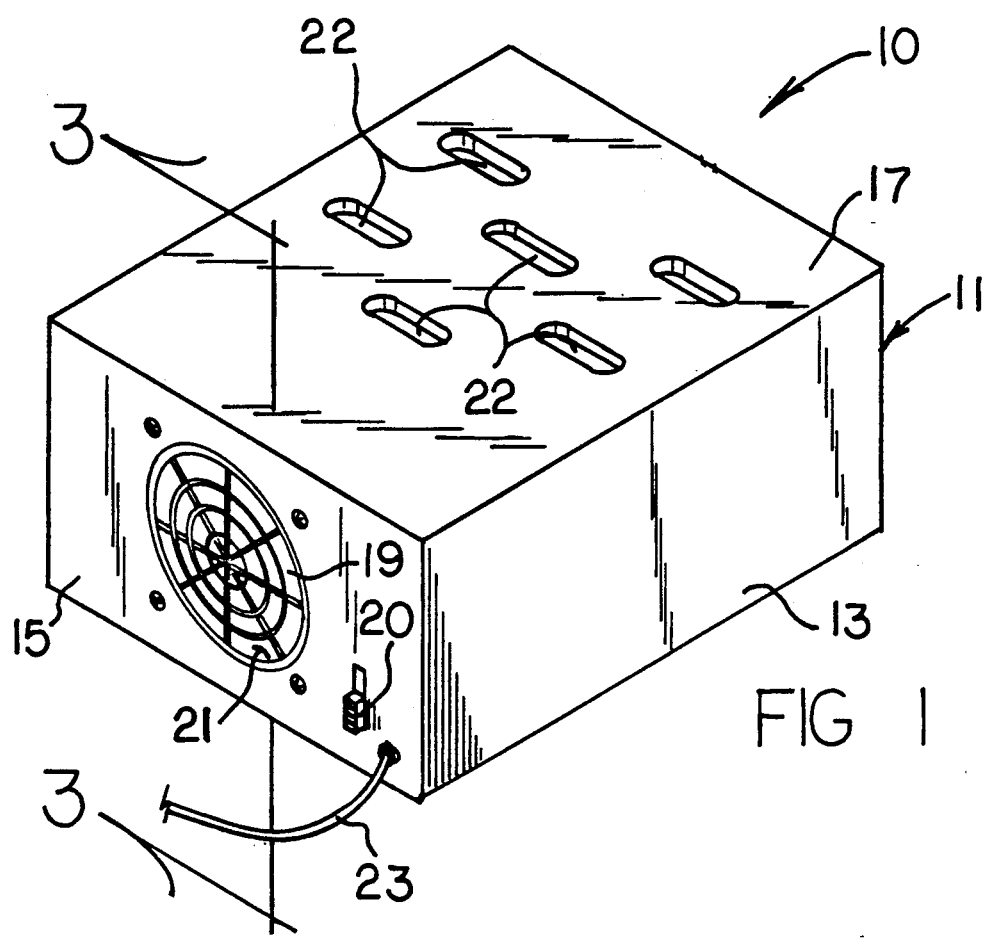
FIG. 1 is an isometric illustration of the instant invention.
Figure 2:
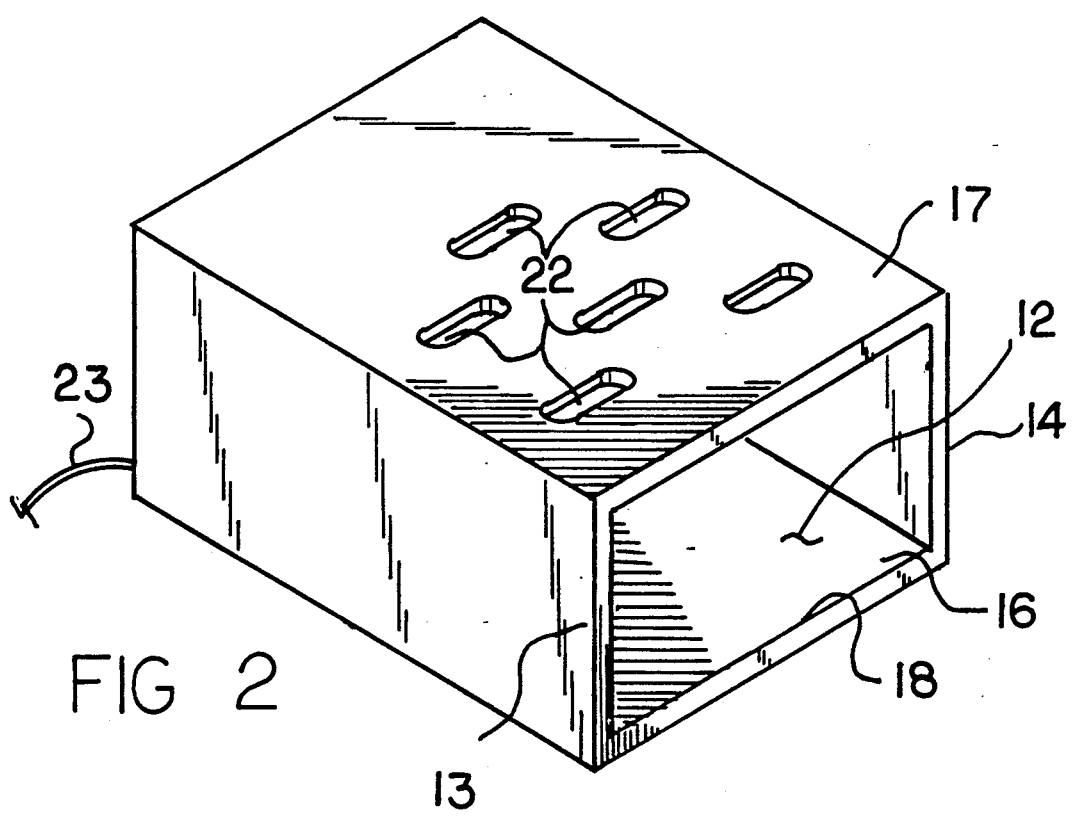
FIG. 2 is an isometric rear view of the invention.

With reference now to the drawings, and in particular to FIGS. 1 to 8 thereof, a new and improved battery cooling apparatus embodying the principles and concepts of the present invention and generally designated by the reference numerals 10, 10a, and 10b will be described.

Figure 3:
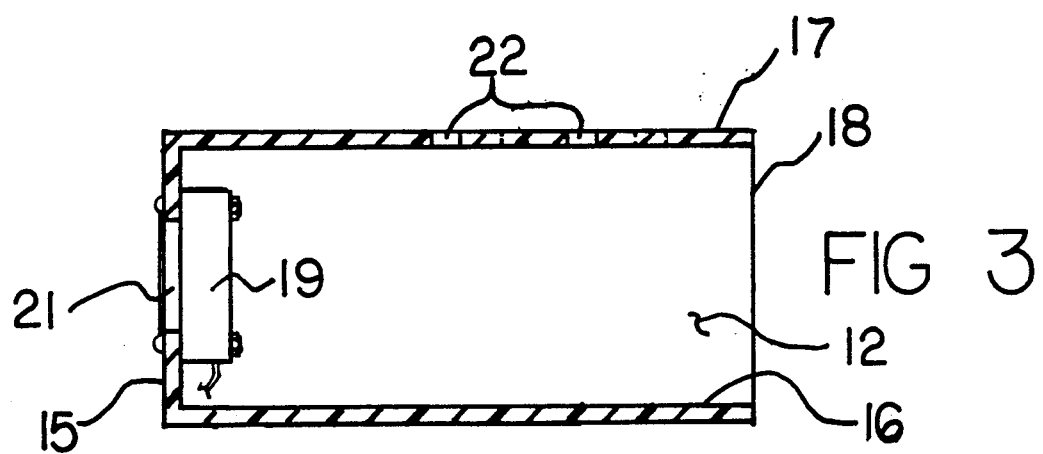
FIG. 3 is an orthographic view, taken along the lines 3—3 of FIG. 1 in the direction indicated by the arrows.
Figure 8A:
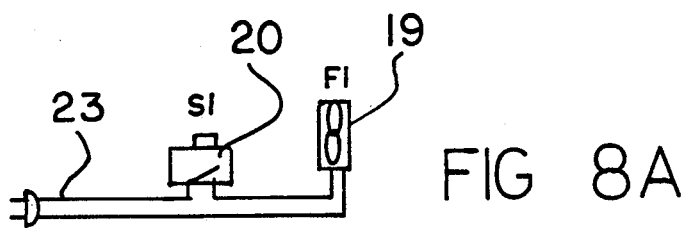
FIG. 8a is a diagrammatic illustration of the circuitry utilized in operation of the fan member.

More specifically, the battery cooling apparatus 10 (See FIG. 1 for example) of the instant invention essentially comprises a housing 11, including a housing cavity 12 (FIGS. 2 and 3) therewithin. The cavity 12 is defined by a first side wall 13 (FIGS. 2 and 3) spaced from a second side wall 14 (FIGS. 2 and 3) with the first and second side walls orthogonally mounted at opposed ends to an end wall 15 (FIGS. 1 and 3). A floor 16 (FIGS. 2 and 3) and a top wall 17 (FIGS. 1-3) define the cavity 12, with an entrance opening 18 (FIGS. 2 and 3) directed into the cavity 12 through the housing 11. A fan member 19 (FIGS. 1 and 3) mounted within the end wall 15 is operative through a fan member switch 20 (FIG. 1). The fan member 19 is mounted within an opening 21 (FIGS. 1 and 3) within the end wall 15 to direct cooling air from exteriorly of the housing to direct such air into the cavity 12. A plurality of battery receiving openings 22 (FIGS. 1-3) are directed through the top wall 17 to receive a battery member 24 (FIG. 4) within each battery opening 22. An electrical power supply cord 23 (FIGS. 1 and 2) is provided to direct electrical current to the fan member 19 through the switch 20, in a manner as set forth in FIG. 8a.

Figure 4:
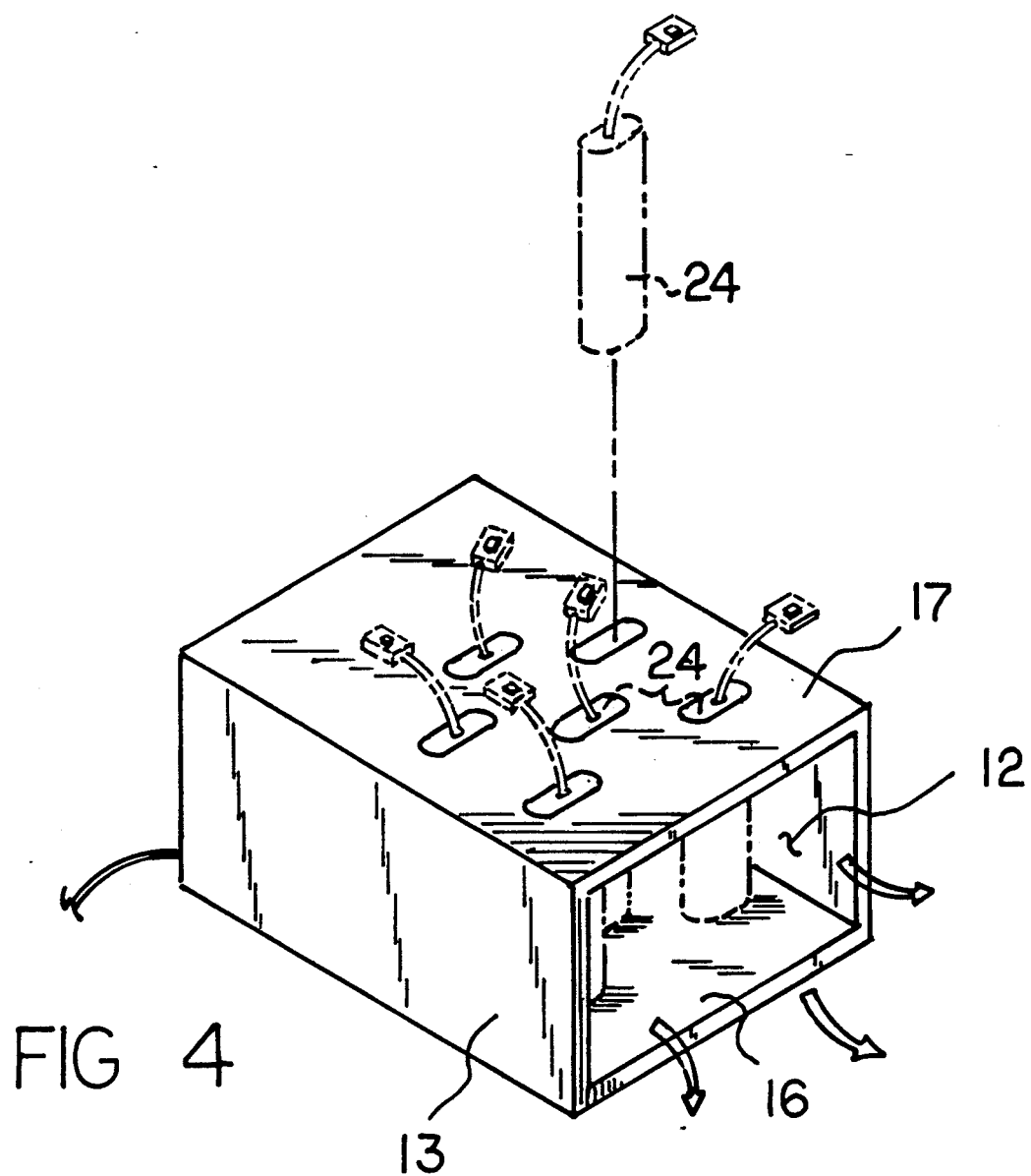
FIG. 4 is an isometric illustration of the invention receiving the batteries to be cooled therewithin.

In this manner, closure of the switch 20 directs cooling air through the fan member opening 21 projecting such air about the batteries 24 when positioned within the cavity 12, as illustrated in FIG. 4, projecting such exhausted air through the entrance opening 18.

Figure 5:
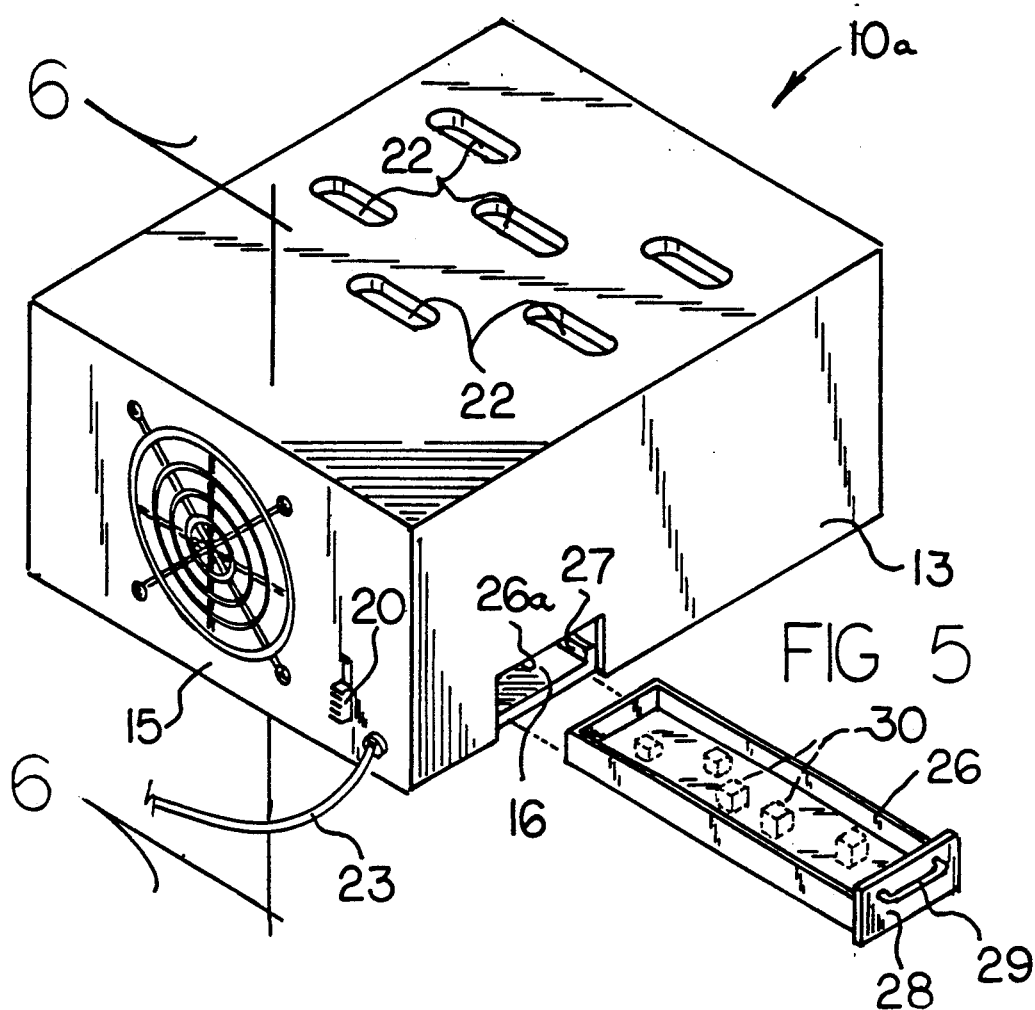
FIG. 5 is an isometric illustration of a modification of the invention.
Figure 6:
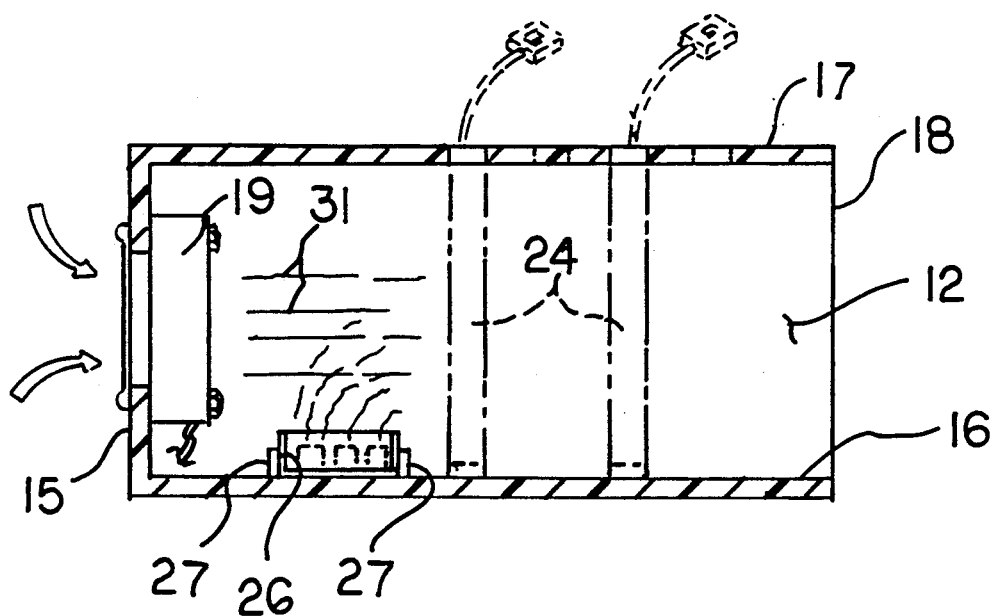
FIG. 6 is an orthographic view, taken along the lines 6—6 of FIG. 5 in the direction indicated by the arrows.

The FIGS. 5 and 6 illustrate a modified apparatus 10a to further include a first side wall opening 25 to receive a support container 26 therethrough. The floor 16 includes a plurality of parallel guide ribs 27 fixedly mounted to the floor to receive the support container 26 in a guided relationship therebetween. The container 26 includes a container front wall 28 mounting a handle 29 for ease of projection of the container 26 within the cavity 12 through the first side wall opening 25. It should be noted that the floor 16 is defined by a predetermined width, with the support container 26 defined by a predetermined length substantially equal to the predetermined width to direct the support container 26 between the first side wall 13 and the second side wall 14. The container 26 is provided with a predetermined quantity of dry ice members 30 therewithin, whereupon projection of the air currents 31 through the cavity 12 directs cooling of the dry ice members through the cavity to accelerator the cooling of the battery members 24.

Figure 7:
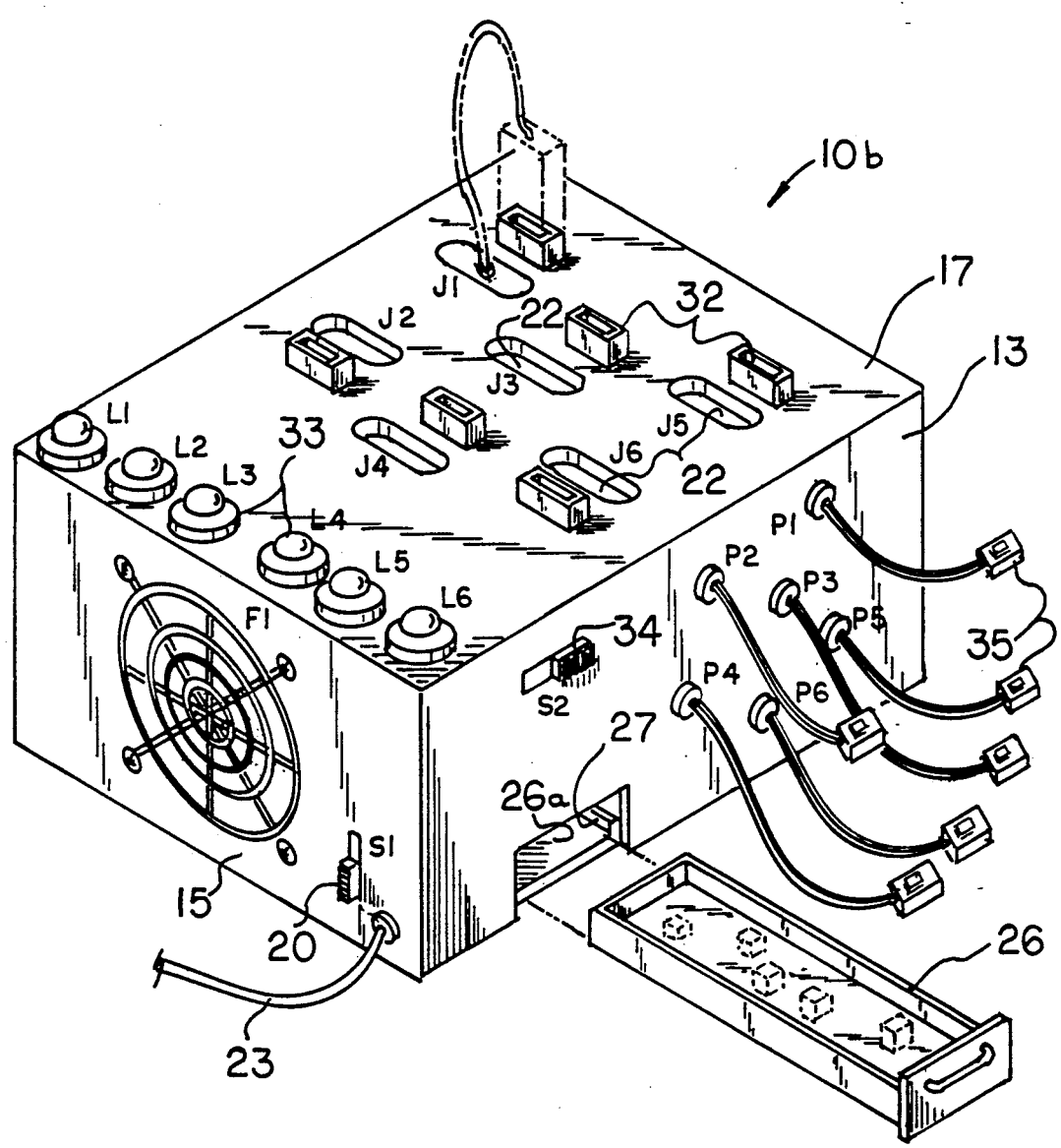
FIG. 7 is an isometric illustration of a further modification of the invention.
Figure 8:
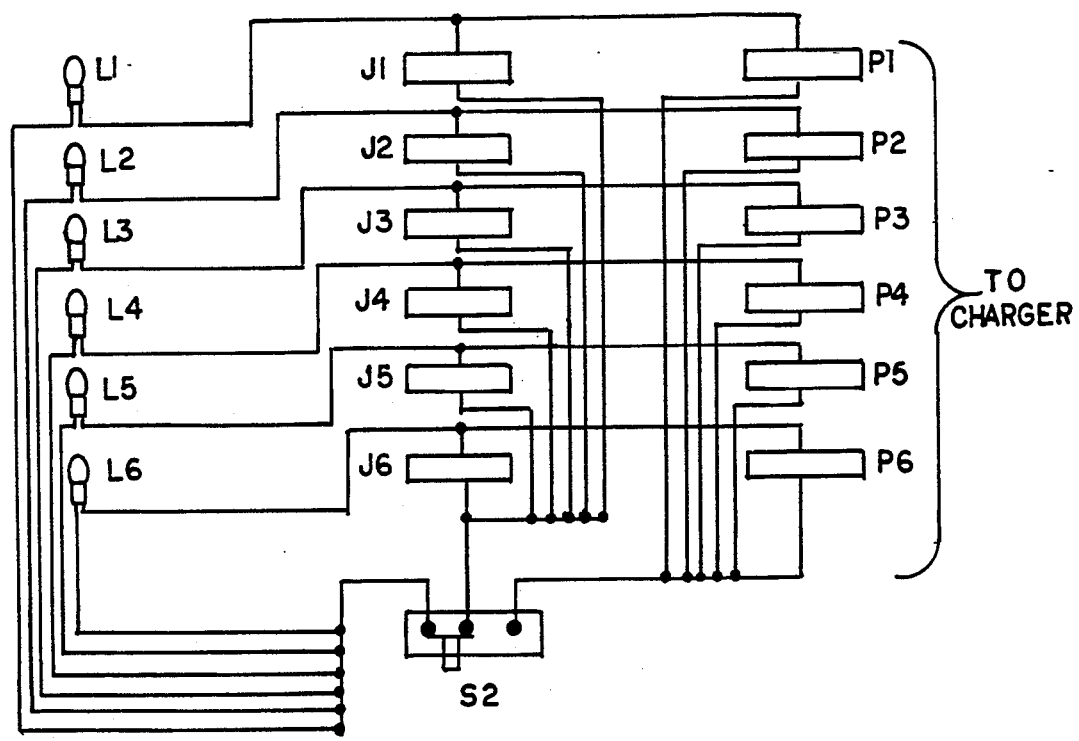
FIG. 8 is a schematic illustration of the battery discharge and charge structure utilized in the modification of the invention depicted in FIG. 7.

The FIGS. 7 and 8 set forth a further modified apparatus 10b, wherein connecting jacks 32 are provided within the top wall 17, wherein a charge-discharge switch 34 is mounted to the first side wall 13 as the jacks "J-1", "J-2", "J-3", "J-4", "J-5", and "J-6" positions are in selective electrical communication with associated discharge loads 33 set forth as light members "L-1", "L-2", "L-3", "L-4", "L-5", and "L-6" respectively relative to the connecting jacks 32. Charge connectors 35, "P-1", "P-2", "P-3", "P-4", "P-5", and "P-6" are in selective and respective communication with the connecting jacks 32, in a manner as set forth diagrammatically in FIG. 8 to provide for the selective discharge and charging of the battery members when the battery members are in electrical communication with the respective jacks to thereby provide for complete discharge of each battery prior to a recharging operation to thereby completely cycle the battery permitting a more complete recharging of the battery for subsequent use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustration only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A battery cooling apparatus, comprising,
    a housing, the housing including a first side wall spaced from a second side wall, and a floor spaced from a top wall,
    and
    an end wall mounted to the first side wall, the second side wall, floor, and top wall, with an entrance opening directed into the housing, and a cavity defined within the housing between the first side wall, second side wall, end wall, floor, and top wall,
    and
    a fan member,
    and
    a fan member opening directed through the end wall, and the fan member mounted within the cavity adjacent the fan member opening, and a fan member switch mounted to the housing to permit selective actuation of the fan member to direct air currents through the cavity and directing the air currents through the entrance opening,
    and a plurality of battery receiving openings directed through the top wall, wherein each opening is arranged to receive a battery member therethrough to position each battery member within the cavity.

2. An apparatus as set forth in claim 1 including a first side wall opening directed through the first side wall, wherein the first side wall opening includes a support container slidably directed through the first side wall, wherein the floor is defined by a predetermined width and the support container is defined by a predetermined length substantially equal to the predetermined width to project the support container from the first side wall to the second side wall, and the first side wall opening is positioned adjacent the floor, and a plurality of spaced parallel guide ribs fixedly mounted to the floor adjacent the first side wall opening to guide the support container along the floor between the guide ribs, and the support container including a front wall, the front wall including a handle to ease manual manipulation of the support container directed through the first side wall opening, and a predetermined quantity of a cooling medium mounted within the container, wherein actuation of the fan member enhances cooling of the battery members mounted within the cavity.

3. An apparatus as set forth in claim 2 including a connecting jack mounted adjacent each battery receiving opening through the top wall, and each connecting jack arranged for electrical communication with one of said battery members, and a plurality of light members mounted to the housing, and each of said light members arranged in selective communication with one of said connecting jacks, and each of a plurality of charge connectors directed through the housing into electrical communication with one of said connecting jacks, and a charge-discharge switch mounted to the housing to permit selective electrical communication of one of said connecting jacks with one of said light members and with one of said charge connectors, the charge connectors arranged for electrical communication with an electrical battery charger.

* * * * *